Oct. 17, 1939.   H. R. FULTON   2,176,838
DESUPERHEATER CONTROL
Filed April 21, 1937
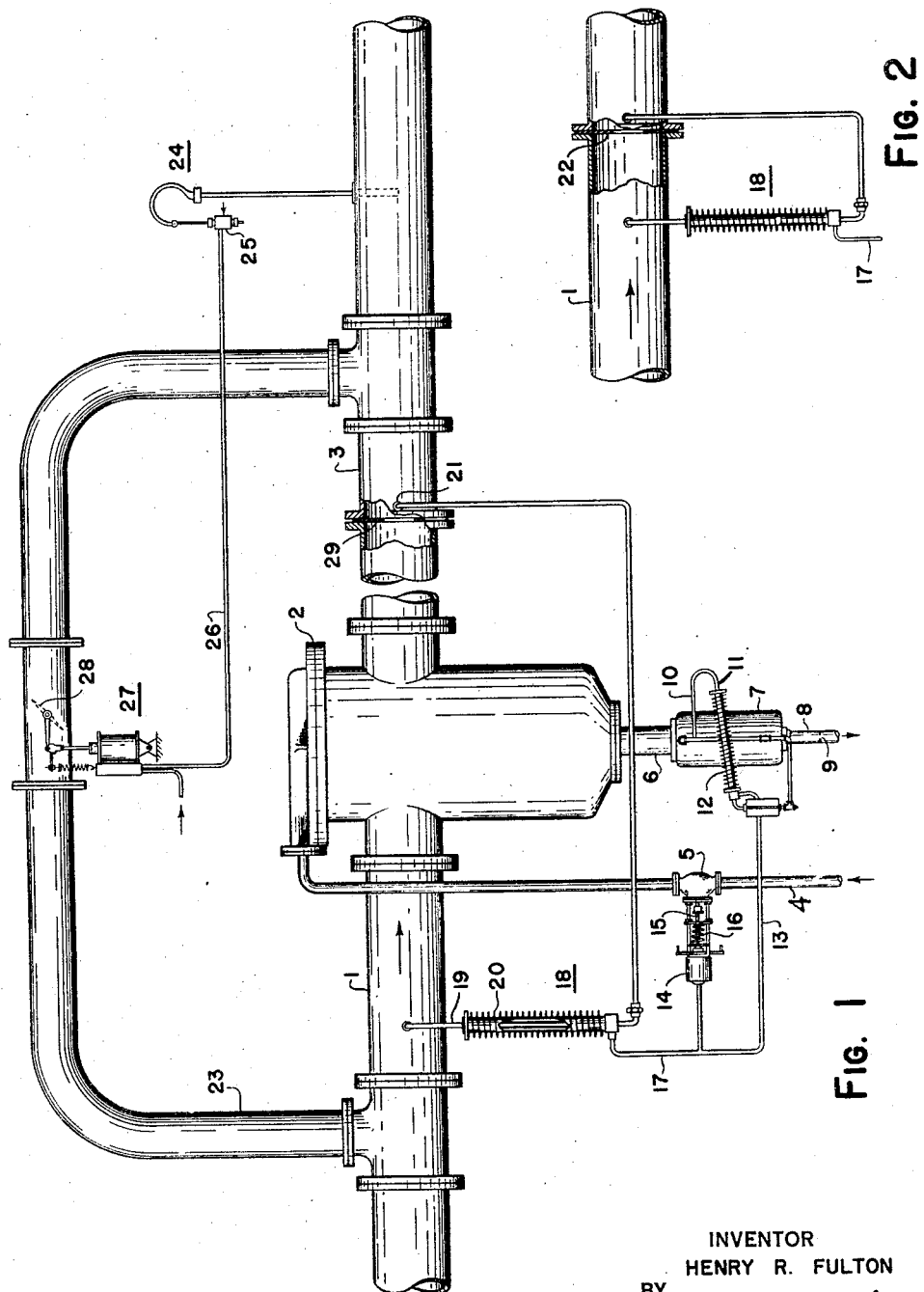
INVENTOR
HENRY R. FULTON
BY
Raymond W. Junkins
ATTORNEY Patented Oct. 17, 1939

2,176,838

UNITED STATES PATENT OFFICE 2,176,838

DESUPERHEATER CONTROL

Henry R. Fulton, Mount Lebanon, Pa., assignor to Bailey Meter Company, a corporation of Delaware Application April 21, 1937, Serial No. 138,075

2 Claims. (Cl. 122—479)

This invention relates to apparatus for partially or completely desuperheating vapor.

It is an object of my invention to provide apparatus for so controlling the operation of a vapor desuperheater that a constant vapor temperature at the outlet of the desuperheater is maintained regardless of changes in the rate of flow of vapor through the desuperheater.

It is a further object of my invention to provide apparatus stable in operation, economically constructed, and readily installed.

It should be understood that the term "desuperheated vapor" or "desuperheated steam" as used in this specification applies to vapor or steam which may be only partially desuperheated and not necessarily to zero degrees of superheat unless a specific statement is made indicating that partial or complete desuperheated vapor is intended.

In the drawing:

Fig. 1 illustrates more or less diagrammatically one embodiment of my invention.

Fig. 2 is a modified arrangement of a part of the apparatus shown in Fig. 1.

I have illustrated my invention as applied to a cartridge type desuperheater, such as is illustrated and described in Elliott Company's Bulletin N-9. It will be apparent, however, that the invention may be applied to other types of desuperheaters.

In the arrangement shown, vapor such as superheated steam for example, to be desuperheated passes through a conduit 1 into a desuperheater 2 and is exhausted therefrom through a conduit 3. Desuperheating liquid is admitted to the desuperheater through a supply pipe 4, in which is located a regulating valve 5 for controlling the rate of admission.

Excess desuperheating liquid in the desuperheater, that is liquid which is not flashed into vapor or entrained, passes through a nipple 6 into a liquid reservoir 7. A continuous blowdown from the reservoir 7 is maintained through a vent 8 in which is located an orifice 9 which serves to maintain a substantially constant rate of liquid flow through the vent.

The rate of flow of liquid to the desuperheater is preferably controlled to maintain a substantially constant liquid level in the reservoir 7, thereby insuring under ordinary conditions completely desuperheated vapor in the outlet conduit 3. Spanning the reservoir 7 in elevation is a tube 10 having an inclined section 11. The level of the liquid in the tube 10 will be the same as that in the reservoir 7 and the inclined section is so arranged vertically with respect to the reservoir that the liquid level is at the approximate mid-point thereof.

Surrounding the inclined section 11 throughout substantially its entire length is a closed pressure tight shell 12 provided with suitable cooling fins and connected by a pipe 13 to an expansible chamber, such as a bellows or diaphragm diagrammatically illustrated at 14. The valve 5 is acted upon by the device 14 through a valve stem 15 and a loading spring 16, so that for every pressure within the chamber 14 there is a definite opening of the valve, and accordingly a definite rate of flow of desuperheating liquid to the desuperheater.

With the system cold, that is with no vapor present within the tube 10, the chamber 14, pipe 13, and shell 12, are completely filled with a volatile liquid. Thereafter with the system in operation and the tube 10 partially filled with heated vapor, the level of liquid in the shell 12 will follow that in the tube 10. As the level in the tube goes down, for example, a small portion of the liquid in the shell 12 will vaporize, forcing the level therein downward and maintaining it in close correspondence with that in the tube 10. As the level within the shell 12 moves downward, a proportionate amount of liquid is displaced from the shell and into the expansible chamber 14, positioning the valve 5 in an opening direction, increasing the rate of flow of desuperheating liquid and tending to restore the level within the reservoir 7 to the predetermined value.

The arrangement of the tube 10 and shell 12 I have shown is known as a, "pressure generator". As such it is well known in the art and comprises no part of my present invention.

If the flow of vapor through the desuperheater remains substantially constant, or fluctuates but slowly, the apparatus I have so far described will operate to produce completely desuperheated vapor. However, where the rate of flow fluctuates rapidly through a wide range, vapor at one moment carrying entrained moisture and at the next more or less superheat will be produced. My invention further contemplates apparatus for modifying the positioning of the valve 5 instantaneously with changes in the rate of vapor flow, so that regardless of the extent of rapidity of the fluctuation in the rate of flow through the desuperheater completely desuperheated steam is exhausted therefrom.

Referring to Fig. 1, I therein show connected to the chamber 14 by a pipe 17 a pressure generator 18 comprising a tube 19 and shell 20. The tube 19 is connected to the conduit 1 ahead of the desuperheater and at a point 21 beyond the desuperheater. It forms in effect a U-tube, one leg of which comprises the inner tube of the pressure generator 18.

As known, the pressure difference across the desuperheater will vary as the flow of vapor therethrough, and accordingly the condensate level within the pressure generator tube 19 will fluctuate in accordance with the rate of vapor flow through the desuperheater. As the rate of vapor flow increases, for example, the condensate level within the tube 19 will fall, likewise causing the level of liquid within the shell 20 to fall, forcing a proportionate volume from the shell into the expansible chamber 14, opening the valve 5 a proportionate amount.

In some cases it may not be feasible or desirable to use the pressure differential across the desuperheater as a measure of the rate of vapor flow therethrough. In such cases the modified arrangement shown in Fig. 2 may be employed. Therein the pressure generator 18 is shown spanning an orifice 22 positioned in the conduit 1, and effective for producing a differential pressure bearing a functional relation to the rate of vapor flow through the desuperheater.

Under some conditions it is desired to only partially desuperheat the steam so that some predetermined vapor temperature is maintained in the outlet conduit 3. In such cases I provide a by-pass conduit 23 around the desuperheater so that the temperature obtained in the conduit 3 after being rejoined by the by-pass 23 will be proportional to the mean temperature of the two streams of vapor modified by their relative rates of flow.

In order to proportion the rate of vapor flow between the desuperheater 2 and by-pass 23 to maintain a desired temperature of the vapor beyond the by-pass I provide a temperature sensitive element 24 arranged to actuate a pilot valve 25. The pilot valve 25 may be of the type described and claimed in patent to Johnson, No. 2,054,464, dated September 15, 1936. The pilot 25 serves to establish a fluid loading pressure proportional to the magnitude of the temperature within the conduit 3. That is, upon the temperature of the vapor decreasing below the desired value for example, the loading pressure established by the pilot 25 will decrease proportionately. Conversely, upon the temperature of the vapor within the conduit 3 rising above the desired value the loading pressure will increase proportionately. Loading pressures established by the pilot 25 are transmitted through a pipe 26 to a control drive 27.

Positioned in the by-pass 23 by the control drive 27 is a butterfly damper 28. The control drive 27, as shown, is actuated by fluid pressure under control of the loading pressure established by the pilot 25. That is, for every loading pressure there will be a definite position of the damper 28. Thus, for example, when the temperature of the vapor in the outlet conduit 3 increases above the desired value, the butterfly damper 28 will be positioned in a closing direction an amount proportional to the increase in vapor temperature above the desired value. Less vapor will then pass through the by-pass conduit 23 and a greater amount through the desuperheater 2, restoring the temperature of the vapor in the outlet 3 to the desired value.

I have shown positioned in the outlet conduit 3 an orifice 29, which may or may not be necessary, depending upon the characteristics of the particular system to which the control is applied, arranged to increase the pressure drop between the by-pass connections 19, 21 so that a sufficient potential vapor flow through the by-pass 23 will at all times be available.

While I have chosen to illustrate and describe a preferred embodiment of my invention, it will be understood that this is by way of illustration only and that I am not to be limited thereby, but only as to the claims in view of the prior art.

What I claim as new, and desire to secure by Letters Patent of the United States, is:

1. In combination, a desuperheater of the direct contact type wherein the desuperheating liquid is vaporized by the vapor to be desuperheated and forms a part of the desuperheated vapor, a pipe for admitting desuperheating liquid to the desuperheater, a valve in said pipe for controlling the rate at which desuperheating liquid is admitted to the desuperheater, a vapor condensing pipe arranged in the form of a U-tube having a pair of vertical legs, one of said legs being connected to the vapor inlet of said desuperheater, the other of said legs being connected to the vapor outlet of said desuperheater, the U-tube and said connections thereto being so arranged that the level of vapor condensate in said first named leg is dependent upon the pressure drop across said desuperheater, and a vapor generator surrounding said first leg for establishing a fluid pressure proportional to the liquid level therein, said valve means positioned by said fluid pressure whereby the rate at which desuperheating liquid is admitted to the desuperheater is regulated in accordance with the pressure drop across the desuperheater.

2. In combination with a desuperheater of the direct contact type wherein vapor is admitted through an inlet conduit, vaporizes a part of the desuperheating liquid and is exhausted through an exhaust conduit together with the vaporized desuperheating liquid, a liquid containing reservoir in communication with the desuperheater for receiving the excess desuperheating liquid, a discharge connection from said reservoir for maintaining a substantially constant flow of desuperheating liquid therefrom, a vapor condensing pipe arranged in the form of a vertical U-tube having a pair of vertical legs, one of said legs being connected into said inlet conduit and the other leg being connected into the outlet conduit, the U-tube and said connections thereto being so arranged that the level of vapor condensate in the first named leg is dependent upon the pressure drop across the desuperheater, a first pressure generator surrounding said first named leg, a second pressure generator disposed to span the liquid level in said reservoir, said pressure generators connected together, valve means for controlling the flow of desuperheating liquid to the desuperheater, and means for controlling said valve means in accordance with the common pressure established by said generators.

HENRY R. FULTON.